S. J. LARSON.
TRUCK.
APPLICATION FILED AUG. 8, 1917.

1,288,057.

Patented Dec. 17, 1918.

WITNESSES
Guy M. Spring
J. P. Campbell

INVENTOR
Selmer J. Larson

BY Richard Owen
ATTORNEY

UNITED STATES PATENT OFFICE.

SELMER J. LARSON, OF PERLEY, MINNESOTA.

TRUCK.

1,288,057.     Specification of Letters Patent.     Patented Dec. 17, 1918.

Substitute for application Serial No. 56,972, filed October 20, 1915. This application filed August 8, 1917. Serial No. 185,182.

*To all whom it may concern:*

Be it known that I, SELMER J. LARSON, a citizen of the United States, residing at Perley, in the county of Norman and State of Minnesota, have invented certain new and useful Improvements in Trucks, of which the following is a specification.

My invention relates to new and useful improvements in trucks.

The primary object of the invention is the provision of a truck adapted for supporting and transporting an automobile or other vehicle, should a wheel or the axle become broken.

A further object of the invention is the construction of a truck of this character which may be adapted to vehicles of different heights.

Figure 1:
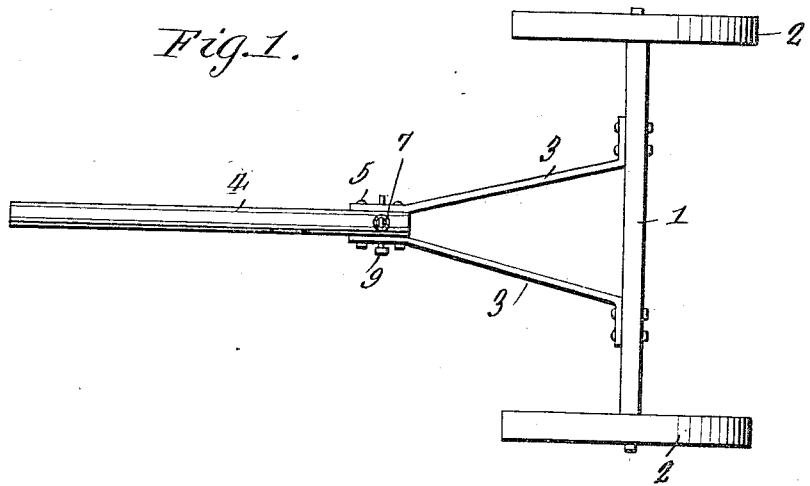
Figure 2:
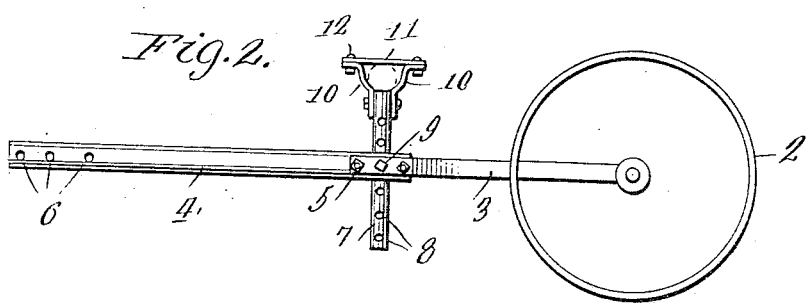

With these and other objects in view the invention consists in the novel details of construction and arrangement of parts which will be more clearly understood from the following description and drawings, in which, Figure 1 is a top plan view of a truck, and Fig. 2 is a view in side elevation thereof.

In the drawings the numeral 1 indicates an axle having the wheels 2 journaled thereon. Brace bars 3 are connected to the axles and extend forwardly therefrom, and have the tongue 4 secured thereto by means of the bolts 5. The tongue 4 is preferably formed of tubing and has a plurality of longitudinally spaced perforations 6 transversely therein, whereby an extension may be secured to the pole when desired. A vertical opening is formed through the inner end of the pole 4 and is adapted to receive a post 7 having a plurality of vertically spaced openings 8 therein. A bolt 9 passes through the braces 3, tongue 4 and openings 8 whereby the post 7 may be adjusted to various heights.

Straps 10 are secured to the top of the posts 7 and are of the shape shown, whereby a plate or strip 11 may be secured thereto by means of bolts 12. As is clearly shown in Fig. 2, of the drawings, the plate 11 extends over the top of the post 7 and is connected to each of the straps 10, in order that a sufficient space is left between the top of the post 7 for receiving an axle or other portions of a vehicle to which the truck is adapted to be secured. The axle or other portion of the vehicle is shown in dotted lines in Fig. 2 of the drawings. The straps 10 are preferably connected to the post 7 in such a manner that they can swing so as to allow the axle, which is held thereby, to adjust itself to any unevenness in the ground over which the vehicle is drawn.

Having fully described the detailed construction of my invention, it is thought that the advantages and operation will be clearly understood. The truck is especially adapted for garages which often have calls for transporting an automobile, or other vehicle, which has broken a wheel, axle, or other portion thereof. As above described, the axle or other portion of the vehicle is clamped between the plate 11 and top of the post 7 and the pole 4 may be secured to any other portion of the vehicle or to the vehicle which is pulling the one having the broken parts. My truck may also be used in such a manner that the vehicle could be moved by its own power. This could be accomplished by securing the pole 4 to the underside of the vehicle in any suitable manner. It will also be seen that by adjusting the post 7 my truck is adapted for use with vehicles of greater or less height and the pole 4 may also be lengthened by using an extension which may be secured by means of bolts passing through the transverse openings 6 in the pole. When it is desired to adjust the post 7, it is only necessary to remove the bolt 9 and then replace it in the desired openings 8 in the post. My truck is of such a size that it may be easily moved from place to place and adjusted to various size vehicles.

Having thus fully described my invention what I claim as new and desire to secure by Letters Patent is:

A truck comprising an axle, wheels mounted on the axle, a tongue secured to the axle, a vertically adjustable post connected to the tongue, straps pivotally connected to the post to swing transversely of the truck, said straps each being bent to form a vertical portion adapted to engage the side of the post, a curved portion extending above the top of the post and a right angle extension from the top of the curved portion, and a plate extending over the top of the post and connected to the right angle extensions.

In testimony whereof I affix my signature in presence of two witnesses.

SELMER J. LARSON.

Witnesses:
E. D. ANDERSON,
INGVALD LARSON.

Copies of this patent may be obtained for five cents each, by addressing the "Commissioner of Patents, Washington, D. C."